United States Patent
Dielacher et al.

(10) Patent No.: US 11,506,763 B2
(45) Date of Patent: Nov. 22, 2022

(54) IMAGE SENSOR WITH INTERLEAVED HOLD FOR SINGLE-READOUT DEPTH MEASUREMENT

(71) Applicant: Infineon Technologies AG, Neubiberg (DE)

(72) Inventors: Markus Dielacher, Graz (AT); Martin Flatscher, Graz (AT); Robert Lobnik, Bad Eisenkappel (AT); Hartwig Unterassinger, Graz (AT)

(73) Assignee: Infineon Technologies AG, Neubiberg (DE)

( * ) Notice: Subject to any disclaimer, the term of this patent is extended or adjusted under 35 U.S.C. 154(b) by 911 days.

(21) Appl. No.: 16/176,817

(22) Filed: Oct. 31, 2018

(65) Prior Publication Data

US 2020/0132819 A1   Apr. 30, 2020

(51) Int. Cl.
  *G01S 7/4865* (2020.01)
  *G01S 7/4863* (2020.01)
  *G01S 17/10* (2020.01)

(52) U.S. Cl.
  CPC .......... *G01S 7/4865* (2013.01); *G01S 7/4863* (2013.01); *G01S 17/10* (2013.01)

(58) Field of Classification Search
  CPC ...... G01S 17/36; G01S 7/4914; G01S 17/894; G01S 17/89
  See application file for complete search history.

(56) References Cited

U.S. PATENT DOCUMENTS

| | | | |
|---|---|---|---|
| 2006/0128087 A1* | 6/2006 | Bamji | H01L 27/0805 257/E27.048 |
| 2011/0129123 A1 | 6/2011 | Ovsiannikov et al. | |
| 2016/0327638 A1* | 11/2016 | Dielacher | G01S 17/36 |
| 2018/0259628 A1 | 9/2018 | Plank et al. | |
| 2018/0295274 A1 | 10/2018 | Nakayama et al. | |
| 2019/0056498 A1* | 2/2019 | Sonn | G01S 17/931 |

FOREIGN PATENT DOCUMENTS

| | | | |
|---|---|---|---|
| DE | 102013208805 A1 * | 12/2013 | .......... G01S 17/894 |
| DE | 102013208805 A1 | 12/2013 | |
| EP | 2894492 A1 | 7/2015 | |

OTHER PUBLICATIONS

DE-102013208805 translation 2013.*

* cited by examiner

*Primary Examiner* — Luke D Ratcliffe
(74) *Attorney, Agent, or Firm* — Murphy, Bilak & Homiller, PLLC

(57) ABSTRACT

Time-of-flight (TOF) systems and techniques whereby a first exposure obtains pixel measurements for a first subset of pixels of a pixel array, using a first reference signal. For a second exposure, the first subset of the pixels, e.g., every second line of the pixel array, are set to a "hold" state, so that values obtained from the first measurement are maintained. A second exposure using a second reference signal is performed for a second subset of the pixels. The first and second reference signals may have different phase shifts relative to a signal modulating an optical signal being measured. The result is an array of pixels in which the first and second subsets hold results of the first and second exposures, respectively. These pixel values can then be read out all at once, with certain calculations being performed directly as pixel values are read from the pixel array.

14 Claims, 6 Drawing Sheets

IMAGE SENSOR WITH INTERLEAVED HOLD FOR SINGLE-READOUT DEPTH MEASUREMENT

BACKGROUND

In optical sensing applications, depth measurements, i.e., measurements of the distance to various features of an object or objects in view of an image sensor may be performed as so-called time-of-flight (ToF) measurements, which are distance measurements determined using the speed of light and image/pixel sensors. The distance to an object of interest is typically calculated per pixel and, once calculated, can be used for depth detection, gesture identification, object detection, and the like. The distance per pixel is combined to create a depth map that provides a three-dimensional image.

Conventional approaches to TOF measurements require multiple sequential exposures, also referred to as copies. Each exposure requires that light generated from a light source be amplitude modulated at a respective phase, the phase being different for different exposures. For example, one approach requires four separate exposures, such as 0°, 90°, 180° and 270°. Measurement information from the four exposures is collected and compared to determine a depth map. For high-precision measurements, with extended unambiguous ranges, even more exposures, e.g., as many as nine separate raw measurements, may be performed.

With these approaches, a large amount of information needs to be stored and processed—for example, if nine separate exposures are performed, nine measurements for each pixel must be stored and processed, typically by an application processor (AP) separate from the integrated circuit containing the image sensor, with the stored multiple exposures then being used to generate the depth map. While this approach allows very precise and detailed distance measurements, large amounts of storage, processing power, and power are needed.

In some applications, high-precision measurements are not needed, or are not always needed. Accordingly, what is needed are techniques to determine distances using the speed of light with reduced complexity and power consumption.

SUMMARY

Time-of-flight (TOF) systems and techniques addressing these needs are disclosed, whereby a first exposure obtains pixel measurements for at least a first subset of the pixels of a pixel array, e.g., for a particular phase shift of a reference signal relative to a signal modulating an optical signal being measured. For a second exposure, the first subset of the pixels, e.g., every second line of the pixel array, are set to a "hold" state, so that the values obtained from the first measurement are maintained. A second exposure, which may use a different phase shift for the reference signal, relative to the modulated optical signal, is performed for a second subset of the pixels, e.g., all of those pixels not set to the hold state. The result is an array of pixels in which the first and second subsets hold the results of the first and second exposures, respectively. These pixel values can then be read out all at once, with certain calculations being performed directly as pixel values are read from the pixel array.

Embodiments of the disclosed techniques include an example method for processing pixel signal values from an image sensor having a plurality of pixels, where each pixel is configured to generate a respective pixel signal value by demodulating received light using a reference signal. This example method includes controlling at least a first subset of the plurality of pixels to generate respective pixel signal values, based on a first reference signal applied to the pixels, for a first exposure. The first subset of the plurality of pixels to are then controlled to hold their respective pixel signal values. While the first subset of the plurality of pixels are holding their respective pixel signal values, a second subset of the plurality of pixels are controlled to generate respective pixel signal values, based on a second reference signal applied to the pixels, for a second exposure. The first and second reference signals may have different phases, with respect to a signal modulating an optical signal being measured. This second subset of the plurality of pixels are then controlled to hold their respective pixel signal values. The example method further comprises subsequently reading out the pixel signal values from (at least) the first and second subsets of the plurality of pixels and converting the read pixel signal values to digital pixel values. In some embodiments, pixel signal values from the first subset of pixels may be combined with pixel signal values for corresponding pixels in the second subset of pixels to obtain a distance measurement.

An example image processing system, according to some embodiments, includes a sensor that comprises a plurality of pixels configured to generate a respective plurality of pixel signal values in response to received light, where each pixel is configured to obtain its respective pixel signal value by demodulating received light using a reference signal. This received light may be reflected from a target scene, for example. The example image processing system further includes a reference signal generator, which is configured to generate a reference signal with a selectable phase, relative to the phase of a modulation signal applied to light transmitted towards target scene, and to provide the reference signal to the plurality of pixels in sensor. The image processing system still further includes an analog-to-digital converter (ADC) circuit, which may include one or several ADCs, operatively coupled to the plurality of pixels in sensor.

The example image processing system further includes control circuitry, which may comprise, for example a processor, controller, or the like, and/or other digital logic. In several embodiments, the control circuitry is configured to cause the image processing system to carry out a method like the one summarized above. Thus, for example, the control circuity may be configured to control the reference signal generator to generate a first reference signal, and to control at least a first subset of the plurality of pixels in the sensor to generate respective pixel signal values, based on the first reference signal, for a first exposure. The control circuitry may be further configured to, subsequent to the first exposure, control the first subset of the plurality of pixels to hold their respective pixel signal values, and to then control the reference signal generator to generate a second reference signal, while the first subset of the plurality of pixels are holding their respective pixel signal values. The first and second reference signals may have different phases, with respect to a signal modulating an optical signal being measured by the image sensor.

The control circuitry in these embodiments is still further configured to, while the first subset of the plurality of pixels continue to hold their respective pixel signal values, control a second subset of the plurality of pixels to generate respective pixel signal values, based on the second reference signal, for a second exposure, and then subsequent to the second exposure, control a second subset of the plurality of pixels to hold their respective pixel signal values. Finally, the control circuitry 61 is configured to read out the pixel signal values, for conversion to respective digital pixel values by the ADC circuit.

DETAILED DESCRIPTION

Figure 1:
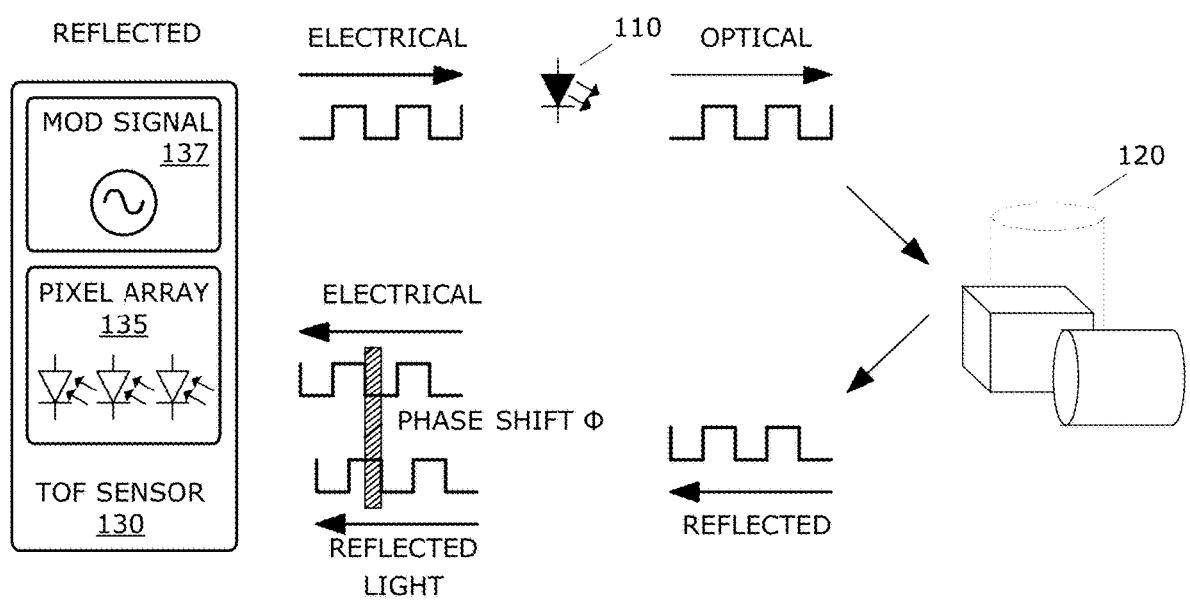
FIG. 1 is a diagram illustrating a system for time of flight measurement according to some of the embodiments described herein.

The present invention will now be described with reference to the attached drawing figures, wherein like reference numerals are used to refer to like elements throughout, and wherein the illustrated structures and devices are not necessarily drawn to scale. In this disclosure, the terms "image" and "image sensor" are not limited to images or sensors involving visible light but encompass the use of visible light and other electromagnetic radiation. Thus, the term "light" as used herein is meant broadly and refers to visible light as well as infrared and ultraviolet radiation.

FIG. 1 illustrates the basic principles of continuous-wave (CW) time-of-flight (TOF) measurements, which are well known. A light source 110, such as a light-emitting diode (LED) or vertical-cavity surface-emitting laser (VCSEL), is modulated with an electrical signal (e.g., a radio-frequency sinusoid at, for example, 300 MHz), so that the light source 110 emits an amplitude-modulated optical signal towards the target scene 120. Traveling at the speed of light c, the light signal reflects from an object or objects in the scene 120 and arrives back at a pixel array 135 in the TOF sensor 130, with the time of flight to the target scene 120 and back imposing a phase shift of $\emptyset$ on the optical signal as received at the pixel array 135, relative to the originally transmitted optical signal.

The modulation signal 137 used to modulate the emitted light, or a phase-shifted version of it, is also supplied as a reference signal to the pixels in pixel array 135, to be correlated with the modulation signal superimposed on the reflected optical signal—in effect, the reflected optical signal is demodulated by each pixel in the pixel array 135.

Figure 2:
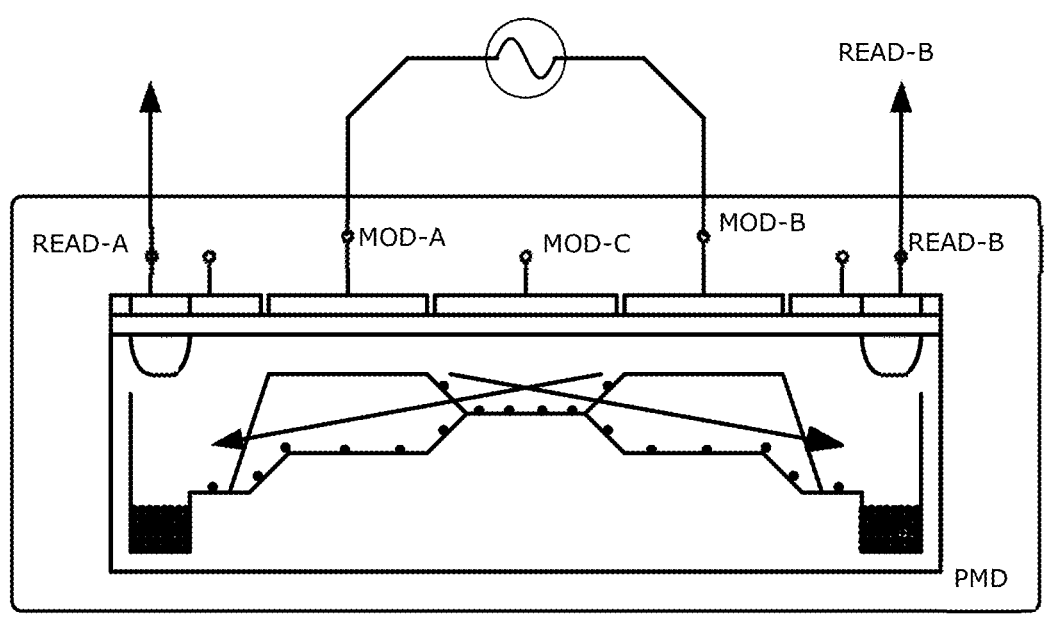
FIG. 2 illustrates an example photonic mixing device (PMD).

While the structure and design of light-sensing pixels may vary, each of the pixels in pixel array 135 may in some instances be a photon mixing device, or PMD. FIG. 2 illustrates the basic structure of an example PMD, which includes readout diodes A and B and modulation gates A and B. A reference signal is applied differentially across the modulation gates A and B, creating a gradient in electric potential across the p-substrate, while incoming light is received at a photo gate/diode. A differential sensor signal is generated across the readout diodes A and B. The sensor signal from a pixel may be integrated for a period of time to determine phase measurement information.

The difference between voltages at the Read-A and Read-B nodes of the PMD corresponds to the correlation between the modulated optical signal detected by the photosensitive diode structures in the illustrated device and the reference signal, which is applied between the Mod-A and Mod-B nodes of the device. Thus, the PMD (and other light-sensitive pixel structures) demodulate the modulated optical signal reflected from the target scene 120, producing a pixel signal value (in this case the difference between voltages at Read-A and Read-B) indicative of the distance traveled by the reflected optical signal, as discussed in further detail below.

While the modulation signal may take any of a variety of forms, the principle behind this correlation/demodulation is most easily seen with a sinusoidal signal as a modulation signal. If the modulation signal g(t) and the received signal s(t) with modulation amplitude 'a' and phase shift '$\emptyset$' are given as:

$$m(t) = \cos(\omega t), \text{ and}$$

$$s(t) = 1 + (a \times \cos(\omega t + \emptyset)),$$

then the correlation of the received signal with the reference signal gives:

$$r(\tau) = \left(\frac{a}{2}\right)\cos(\emptyset + w\tau),$$

which is a function of the phase difference $\emptyset$ between the two signals. It will be appreciated that with a periodic modulation signal, this correlation can be carried out for an extended period of time, e.g., several cycles of the modulating signal, to improve the signal-to-noise ratio of the resulting measurement.

Figure 3:
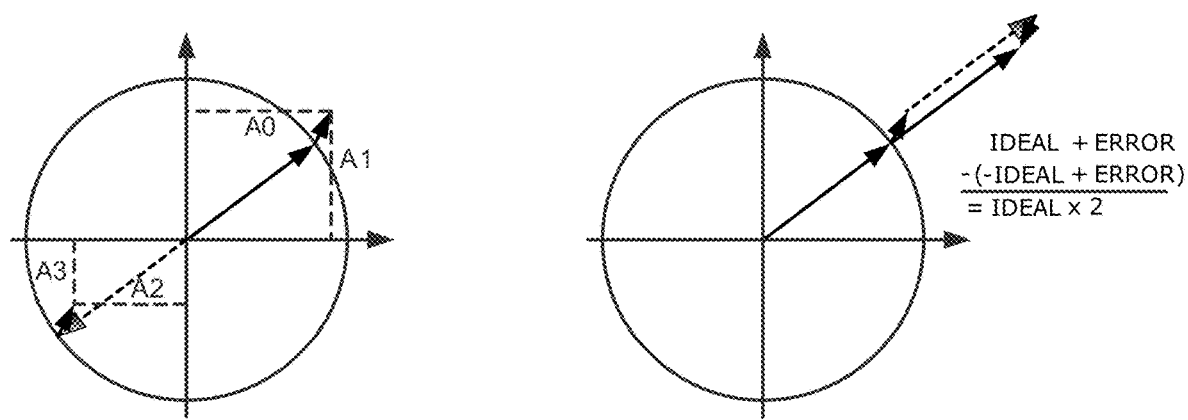
FIG. 3 is a diagram illustrating principles of phase measurement according to time-of-flight (TOF) techniques.

The phase difference between the emitted optical signal and the received reflection of that signal, which is proportional to the distance traveled by the optical signal, can be extracted by an N-phase shifting technique. This requires sampling the correlation function at N different points, e.g., by performing correlations using N different phase shifts of the reference signal, with respect to the modulating signal g(t). At least two measurements are required to calculate this phase shift, and hence to determine the distance traveled. This is often done using four different phase shifts, at 0, 90, 180, and 270 degrees, as this allows for a simple cancellation of systematic offsets in the correlation results. This is seen in FIG. 3, which shows how the correlations A0 and A1, at 0 and 90 degrees, respectively, correspond to a first phase vector having an "ideal" component corresponding to the actual difference traveled by the optical signal and a systematic component reflecting systematic error in the measurements and readout. Likewise, the correlations A2 and A3, at 180 and 270 degrees, respectively, correspond to a second phase vector pointing in the opposite direction, with an exactly opposite "ideal" component and an identical systematic component. In the figure, the ideal components are represented by the vectors extending from the origin to the circle, while the systematic error components are represented by the smaller vectors. The actual phase $\emptyset$ can then be calculated as follows:

$$\emptyset = \arctan\left(\frac{A1 - A3}{A2 - A0}\right).$$

From this phase, the distance, or "depth" to the target scene 120 can be calculated as follows:

$$D = \frac{c \times \emptyset}{4\pi f_{mod}},$$

where $f_{mod}$ is the frequency of the modulating signal. It will be appreciated that because of "phase wrapping," this distance calculation has an ambiguous result, as it is not possible to tell from a single distance calculation whether the distance traveled is less than a single wavelength of the modulating waveform, or multiple wavelengths. Various techniques for resolving this ambiguity are well known, e.g., by incorporating amplitude information obtained from the reflected optical signal, and/or repeating the measurement with a different modulating frequency, but a detailed discussion of these techniques is unnecessary to a full understanding of the presently disclosed techniques and is thus beyond the scope of the present disclosure.

In the calculation above, subtracting A3 from A1 and A0 from A2 cancels the systematic error. Thus, four or more phase measurements are commonly made for each pixel of the pixel array 135, and combined, e.g., as shown in the phase calculation above, to result in a single distance measurement for each pixel. The resulting array of distance measurements thus forms a "depth map" mapping the distances between the pixels and the object or objects in the illuminated scene. However, the accuracy provided by four or more phase measurements per depth value is not always necessary. Further, the use of several measurements per depth map is expensive, in terms of memory usage and processing resources, as the pixel signal value for each pixel in the pixel array 135 must be read from the array and stored several times, with each of these read-outs corresponding to a so-called exposure of the pixel array 135, before being combined into depth map values.

Embodiments of the techniques and devices detailed below address this problem by providing a technique whereby a pixel array is subjected to two (or more) exposures, corresponding to two (or more) phases of the reference signal, relative to the modulated optical signal emitted by the TOF device, but where the pixel signal values are read-out only a single time, reducing memory demands.

The approach is most easily explained with respect to a two-exposure (two-phase) implementation, although it will be appreciated that the technique can be extended to three, four, or more exposures. In an example two-exposure implementation of the technique, the entire pixel array is subjected to a first exposure to the reflected optical signal, with a first phase setting for the reference signal, relative to the signal used to modulate the transmitted optical signal. After this first exposure every second line of pixels is set into a "hold" state, such that it retains the pixel signal value, i.e., the demodulated output representing the correlation between the modulation on the received optical signal and the reference signal. Pixels in a typical pixel array already have this hold state, but, typically, the hold signal is globally applied to all pixels, such that all pixels are in the hold state, or not.

Unlike in conventional approaches to TOF measurements, after this first exposure, no readout of the pixel array is immediately performed. Instead all the other pixels (which are not in hold state) are reset, and another exposure is done, with a second phase setting for the reference signal, relative to the modulation signal applied to the transmitted optical signal. While this second exposure is performed, the first set of pixels, in every second line, are maintained in hold state, thus preserving the information from the first exposure, for those pixels.

After the second exposure, the remaining pixels are set into hold state. The result is an array of pixels which alternately store, from one line to the next, the result of the first or the second measurement. The array can then be read out a single time, effectively providing two phase measurements in one readout. In some embodiments, as discussed below, a distance calculation can be done on the sensor, by combining two neighboring pixels, so as to produce a half-resolution depth map from a single readout of the pixel array.

With this approach it is possible to do a dual-exposure, single-readout measurement, with an on-chip distance calculation that does not require the involvement of an off-board application processor. In some implementations, this may be a special mode of operation, with reduced accuracy compared to a traditional nine-phase measurement, but with significantly reduced power consumption.

The two-exposure approach described above can be generalized to three or more exposures. More generally, the presently described techniques include controlling the pixels of an image sensor so that the pixel signal values captured by a first subset of the pixels during the first exposure are held, during one or more subsequent exposures that generate new pixel signal values for the remaining subset of pixels. Subsequently, the pixel signal values for all of the pixels can be read in a single read-out of the pixel array, with the first subset yielding pixel signal values corresponding to the first exposure, and hence the first phase of the reference signal, and the remaining pixels yielding pixel signal values corresponding to the second (or subsequent) exposure, and hence the second (or other) phase of the reference signal.

It will be appreciated that in some embodiments of the technique described above, the second subset (and any additional subsets) of pixels may generate pixel signal values during the first exposure, with these pixel signal values effectively being discarded during the second exposure. In other words, the second subset of pixels in these embodiments operate normally during the first exposure, with their output values being replaced by values from the second exposure before being read. In other embodiments, however, the second subset of pixels may be deactivated or be otherwise configured to not generate pixel signal values during the first exposure.

It will be further appreciated that the first and second (and any additional) subsets of pixels may comprise all of the pixels of an image sensor or imaging device, in some embodiments, while comprising only some of the pixels of the sensor or imaging device, in others. In other words, in some devices, a first portion of a device's pixels may be controllable according to the techniques described herein, while a second portion of the device's pixels are configured for operation according to conventional techniques.

As discussed in further detail below, in some embodiments the first subset of pixels corresponds to every second row in an array of pixels having rows and columns. When the pixel signal values are read from the array in these embodiments, each pixel in this first subset produces a pixel signal value corresponding to the first exposure, while its closest neighboring pixel in an adjacent row produces a pixel signal value corresponding to the second exposure. If the first and second exposures correspond to a 90-degree difference in the respective reference signal phases, the pixel signal value for each pixel in the first subset can be immediately combined with the pixel signal value for its neighboring pixel in the adjacent row, e.g., according to $$\phi = \arctan\left(\frac{A1}{A0}\right),$$

to obtain a phase value, for direct application to a depth map. As also discussed in further detail below, in some embodiments of the devices disclosed herein, this calculation is performed by logic implemented directly on the same chip incorporating the pixel array, and can be implemented so as to further reduce storage/memory requirements.

Figure 4:
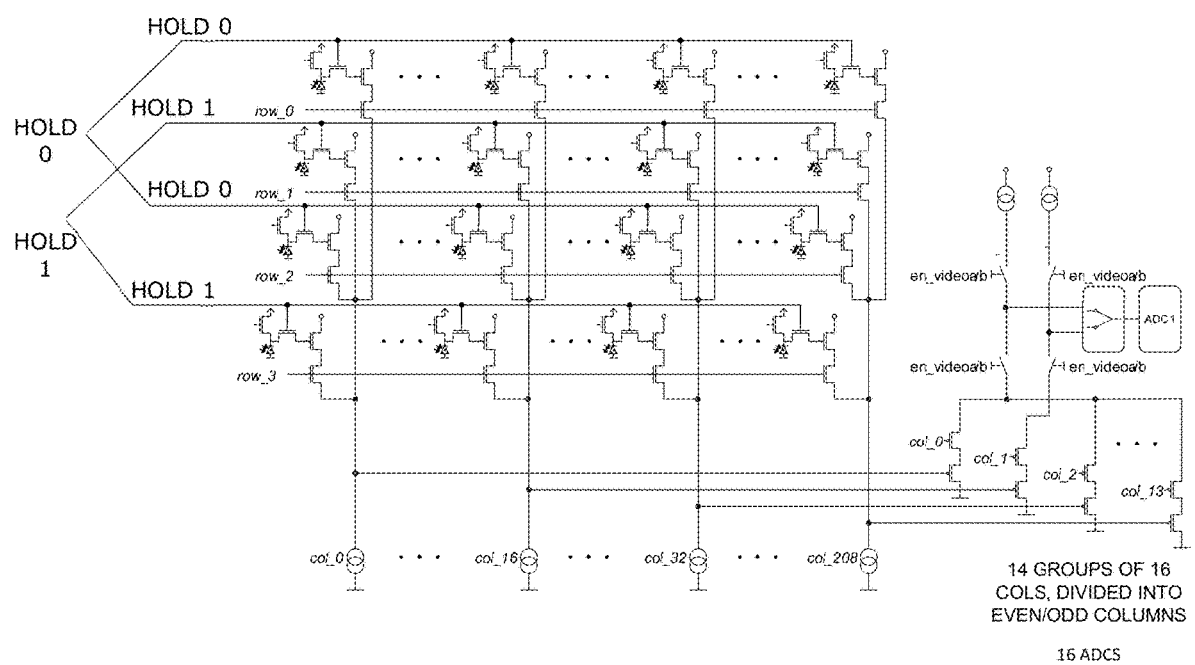
FIG. 4 is a schematic diagram illustrating an example arrangement of pixels and read-out circuitry.

FIG. 4 is a schematic diagram illustrating elements of an example image processing system incorporating aspects of the techniques discussed above. It should be understood that FIG. 4 includes a simplified drawing of a pixel array, only illustrating four lines of pixels of what may be a much larger array of pixels, together with a subset of the corresponding readout circuitry. Furthermore, it should be understood that the illustrated pixels are not PMD pixels, but standard pixels, to simplify the drawing. However, the concept can be directly applied to PMD pixels or to other pixel structures that demodulate a modulated light signal so as to produce a correlation between the modulation on the light signal and a reference signal provided to the pixels.

The lines extending into the pixel array from the left side are the hold lines. In a conventional implementation of a pixel array, the hold lines for all rows are connected to a single global hold signal, which controls the hold switches of all the pixels synchronously. In the illustrated solution, however, the global hold signal is split in two, such that neighboring rows of pixels can be controlled independently. This has no effect on the pixel array itself—only the distribution of the control signals outside the array needs to be modified, compared to conventional pixel array structures.

In the schematic of FIG. 4, there are also so-called row-select signals, labeled row_0, row_1, row_2 and row_3 in the figure. During a readout out of the pixel array, one of the row_select signals at a time is active, which means that there is always one line of pixels connected to the analog-to-digital converters (ADCs), shown on the right of FIG. 4. When analog to digital conversion of the selected row is finished, the next row is selected, and so on. While it is possible to use only a single ADC, that is sequentially connected to the pixel in each column of the selected row, the illustrated implementation uses 16 ADCs, with the 224 columns in this example circuit being divided into groups of 14. With this approach, 16 columns at a time are read, and only 14 sequential read operations.

In some embodiments of a pixel array like that shown in FIG. 4, two blocks of pixel memory are used in ping-pong operation. While the ADC is converting one line of pixels and storing the data in one of the memory blocks, a high-speed data interface (not shown) transfers data from the other memory block to the application processor. When both of these processes are finished (conversion of one line and transmission of another line), the operation switches, meaning that the data which have just been generated in the one memory block is now transferred via the interface and the other memory block is used for conversion.

In some embodiments, logic for calculating an arctangent (ATAN) from two pixel signal values before transmission is added. Advantageously, this may be implemented on the same integrated circuit device that carries the array of pixels, i.e., as a function that is "on-board" the image sensor device rather than in a separate processor. Implementation of an ATAN function can be done using very efficiently, using algorithms like the so-called "CORDIC" algorithm. It will be appreciated that this further reduces the memory requirements—with this approach, a first row of pixel signal values is read from the pixel signal array, converted into digital form, and stored in pixel memory. Then, the adjacent row of pixel signal values is read and digitized—as each of these values is read, it can be immediately combined with the stored value for the neighboring value, and transferred off chip. Thus, half-resolution depth map values are directly delivered by the pixel array circuit to an off-board memory, in some embodiments.

Figure 5:
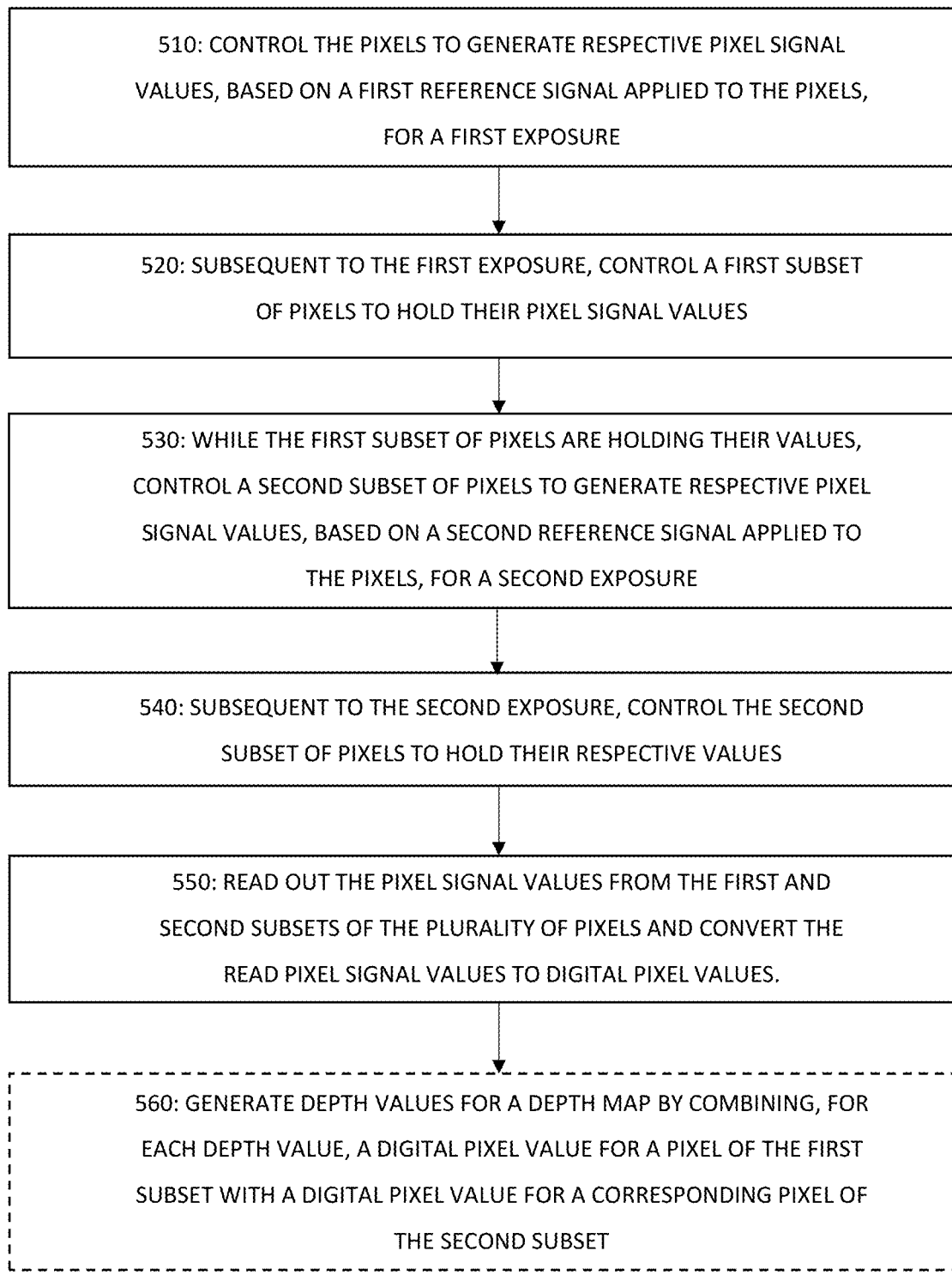
FIG. 5 is a flow diagram illustrating a method for processing pixel signal values from an image sensor, according to some embodiments.

With the above explanations in mind, it will be appreciated that FIG. 5 illustrates an example method for processing pixel signal values from an image sensor having a plurality of pixels, where each pixel is configured to generate a respective pixel signal value by demodulating received light using a reference signal. As shown in block 510, the method includes controlling at least a first subset of the plurality of pixels to generate respective pixel signal values, based on a first reference signal applied to (at least) the first subset of the pixels, for a first exposure. As shown in block 520, the first subset of the plurality of pixels are then controlled to hold their respective pixel signal values. In some embodiments, pixel signal values are generated for all of the pixels of the pixel array during this first exposure, but the pixel measurements for pixels other than the first subset are not maintained—i.e., these pixel signal values are not "held" after the first measurement.

While the first subset of the plurality of pixels are holding their respective pixel signal values, a second subset of the plurality of pixels are controlled to generate respective pixel signal values, based on a second reference signal applied to (at least) the second subset of the pixels. This is illustrated in block 530. As shown at block 540, this second subset of the plurality of pixels are then controlled to hold their respective pixel signal values.

As discussed with respect to the detailed examples provided above, the first reference signal may have a first phase, relative to a modulating signal applied, during the first exposure, to an optical signal being measured by the image sensor, while the second reference signal, which may otherwise be identical to the first reference signal, has a second phase, relative to the modulating signal applied, during the second exposure, to the optical signal being measured by the image sensor. It will be appreciated that this difference in phase between the first and second reference signals may be generated by introducing a phase shift to an input reference signal, between the first and second exposures, or by introducing a phase shift to the modulating signal applied to the optical signal under measurement, between the first and second exposures, or by a combination of both.

While not shown in FIG. 5, this technique can be extended to a third, fourth, or more subsets of pixels, corresponding to respective third, fourth, and subsequent phases. In any case, the illustrated method further comprises subsequently reading out the pixel signal values from (at least) the first and second subsets of the plurality of pixels and converting the read pixel signal values to digital pixel values, as shown at block 550. It should be further understood that the image sensor may, in some embodiments, have further pixels, in addition to those that are controlled according to the techniques described herein.

In some embodiments, the plurality of pixels are arranged in an array having lines and columns, e.g., where the first subset of pixels comprises pixels in every odd or even line of the array and the second subset of pixels comprises the remaining pixels. As discussed above, this makes it especially convenient to perform on-board phase calculations, using neighboring pixels that correspond to different exposures with different phases for the reference signals applied during the exposures. Thus, in some embodiments of the illustrated method, the method may further include generating depth values for a depth map by combining, for each depth value, a digital pixel value for a pixel of the first subset with a digital pixel value for a corresponding pixel of the second subset. This is shown at block 560 of FIG. 5, which is illustrated with a dashed outline to indicate that it need not be present in every embodiment or instance of the illustrated method. In some of these embodiments, the plurality of pixels are arranged in an array having lines and columns, the first subset of pixels comprising pixels in every odd or even line of the array and the second subset of pixels comprising the remaining pixels, and wherein said combining comprises, for each depth value, combining a digital pixel value for a pixel in any given line with the digital pixel value for the neighboring pixel in an immediately adjacent line. In some embodiments, the difference between the phase of the first reference signal and the phase of the second reference signal, relative to the signal modulating the optical signal under measurement, is 90 degrees, in which case said combining may comprise computing an arctangent of a ratio of the digital pixel values for the pixels.

Figure 6:
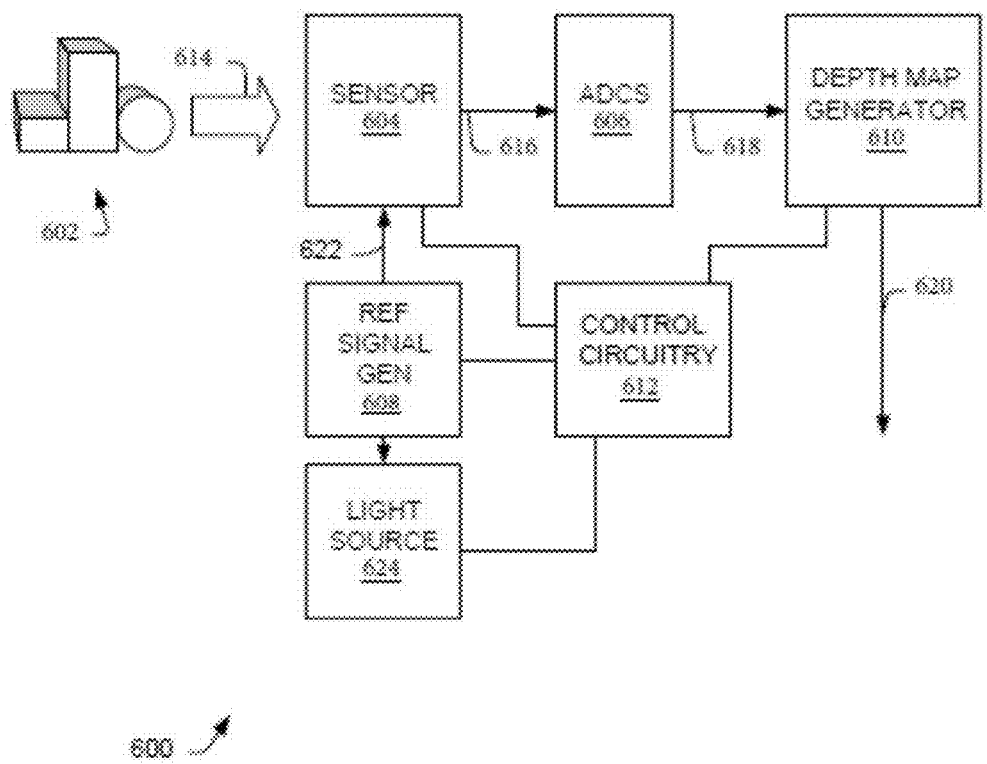
FIG. 6 is a block diagram illustrating components of an example image processing system, according to some embodiments.

FIG. 6, correspondingly, illustrates an example image processing system 600, according to several embodiments of the presently disclosed devices and systems. The system 600 can be utilized to detect objects, e.g., as shown in target scene 602, as well as to determine distances to the detected objects. System 600 may be a continuous-wave TOF system, such as a photon modulation device (PMD)-based TOF system.

The illustrated system 600 includes a light source 624, which is configured to amplitude modulate a beam of light and emit the amplitude-modulated light towards the scene 602. The amplitude modulation may be based on a reference signal generated by reference signal generator 608. The reference signal may be a radio-frequency (RF) signal, e.g., in the MHz range, although other modulation frequencies can be used. The emitted light can include light having varied ranges of wavelength, such as sunlight and infra-red. The emitted light reflects from one or more objects in the scene and returns to the sensor 604.

Image process system 600 may be configured to carry out a technique whereby a first exposure obtains pixel measurements for at least a first subset of the pixels of a pixel array at a single interval of time, for a particular phase shift of the reference signal, relative to a signal modulating the optical signal under measurement. For a second exposure, each of the first subset of the pixels is set to a "hold" state, so that the values obtained from the first measurement are maintained. This first subset may be, for example, every second line of the pixel array. In some embodiments, pixel measurements are obtained for all of the pixels of the pixel array during the first measurement/exposure, but the pixel measurements for pixels other than the first subset are not maintained—i.e., these pixels are not "held" after the first measurement. A second exposure, using a different phase (e.g., with a 90-degree shift, relative to the first exposure) is performed for a second subset of the pixels, e.g., all of those pixels that were not set to the hold state after the first exposure.

The result of this process is an array of pixels in which the first subset of pixels holds the results of the first exposure, while the second subset of pixels holds the results of the second exposure. These pixel values can be read out all at once, after the second exposure, with certain calculations being performed directly, as the pixel values are read from the pixel array. This approach can dramatically reduce the need for data storage, as separate memory for storing pixel values between exposures is not needed. Further, this approach can simplify the processing requirements for generating a depth map, as an on-chip distance calculation can be performed between neighboring pixels as the pixel values are read from the array. Thus, memory, complexity, and power consumption are reduced.

Referring back to FIG. 6, the illustrated image processing system 600 includes a sensor 604, which comprises a plurality of pixels configured to generate a respective plurality of pixel signal values in response to received light 614, where each pixel is configured to obtain its respective pixel signal value by demodulating received light using a reference signal 622. As seen in FIG. 6, received light 602 may be reflected from a target scene 602. As discussed above, while several suitable pixel configurations are possible, one suitable pixel design is the PMD described above.

The numbers of pixels, rows, and columns can vary, from one embodiment to another, and are selected based on factors including desired resolution, intensity, and the like. In one example, these sensor characteristics are selected based on the objects to be detected and the expected distances to the objects. Thus, for example, the pixel resolution of the pixels in sensor 604 may vary, from one embodiment to another. Small objects require a higher resolution for detection. For example, finger detection requires a resolution of <5 mm per pixel at a distance or range of about 0.5 meters. Medium sized objects, such as hand detection, require a resolution of <20 mm per pixel at a range of about 1.5 meters. Larger sized objects, such as a human body, require a resolution of <60 mm per pixel at about 2.5 meters. It is appreciated that the above examples are provided for illustrative purposes only and that variations can occur including other objects, resolutions and distances for detection. Some examples of suitable resolutions include VGA—640×400 pixels, CIF—352×288 pixels, QQ-VGA—160×120 pixels, and the like.

Image processing system 600 further includes a reference signal generator 608, which may be configured, in some embodiments, to generate reference signal 622 with a selectable phase, relative to the phase of a modulation signal applied to light transmitted towards target scene 602, and to provide the reference signal 622 to the plurality of pixels in sensor 604. Image processing system 600 still further includes an analog-to-digital converter (ADC) circuit 606, which may include one or several ADCs, operatively coupled to the plurality of pixels in sensor 604.

The illustrated image processing system 600 further includes control circuitry 612, which may comprise, for example a processor, controller, or the like, and/or other digital logic. In several embodiments, the control circuitry 612 is configured to cause the image processing system 600 to carry out a method like those described above, in connection with FIG. 5. Thus, for example, control circuity 612 may be configured to control the reference signal generator 608 to generate a first reference signal, and to control at least a first subset of the plurality of pixels in sensor 604 to generate respective pixel signal values, based on the first reference signal, for a first exposure. Control circuitry 612 is further configured to, subsequent to the first exposure, control the first subset of the plurality of pixels to hold their respective pixel signal values, and to then control the reference signal generator 608 to generate a second reference signal, while the first subset of the plurality of pixels are holding their respective pixel signal values.

The control circuitry 612, in some embodiments, is configured to generate the first reference signal so that it has a first phase, relative to a modulating signal applied, during the first exposure, to an optical signal being measured by the image sensor, and to generate the second reference signal so that it has a second phase, relative to the modulating signal applied, during the second exposure, to the optical signal being measured by the image sensor. This may be done, for example, by introducing a phase shift to an input reference signal, between the first and second exposures, at a point before the reference signal is applied to the pixels.

Control circuitry 612 in these embodiments is still further configured to, while the first subset of the plurality of pixels continue to hold their respective pixel signal values, control a second subset of the plurality of pixels to generate respective pixel signal values, based on the second reference signal, for a second exposure, and then subsequent to the second exposure, control the second subset of the plurality of pixels to hold their respective pixel signal values. Finally, control circuitry 612 is configured to read out the pixel signal values, as shown at signal 618 in FIG. 6, for conversion to respective digital pixel values by the ADC circuit 606.

In some embodiments of the image processing system 600 shown in FIG. 6, the plurality of pixels in sensor 604 may be arranged in an array having lines and columns, where the first subset of pixels comprises pixels in every odd or even line of the array and the second subset of pixels comprises the remaining pixels. In some embodiments, the image processing system 600 may further include calculating logic, represented in FIG. 6 by depth map generator 610, configured to generate depth values for a depth map by combining, for each depth value, a digital pixel value for a pixel of the first subset with a digital pixel value for a corresponding pixel of the second subset. In some of these embodiments, where the plurality of pixels are arranged in an array having lines and columns, the first subset of pixels comprising pixels in every odd or even line of the array and the second subset of pixels comprising the remaining pixels, the calculating logic may be configured to, for each depth value, combine a digital pixel value for a pixel in any given line with the digital pixel value for the neighboring pixel in an immediately adjacent line. In these embodiments, the difference between the phase of the first reference signal and the phase of the second reference signal, relative to a signal modulating the optical signal under measurement, may be 90 degrees, for example, where the calculating logic is configured to combine digital pixel values by computing an arctangent of a ratio of the digital pixel values for the pixels. this may be done, for example, using an implementation of the well-known CORDIC algorithm, or using a look-up table, for example. In some embodiments, image processing system 600 comprises a memory operatively coupled to the ADC circuit 606, e.g., as part of depth map generator 610, and configured to store digital pixel values for one line of the array at a time, where the calculating logic is configured to compute each arctangent using a digital pixel value stored in the memory and a corresponding digital pixel value for the neighboring pixel in the immediately adjacent line.

In some embodiments, system 600 may be used for low power applications and modes, to mitigate power consumption. However, it is appreciated that the system 600 can be used for other applications and modes. It is also appreciated that variations in the components of the system 100 are contemplated, including additional components and/or omission of shown components.

In one variation, the system 600 uses the combined pixels, as described above to generate a depth map in the low power mode. However, in a high-resolution mode, the same system 600 may use multiple exposures to obtain a higher resolution depth map. In some embodiments, the system 600 can selectively switch between the mode using combined pixels and the mode using multiple exposures to obtain a higher resolution. The mode using combined pixels may be a low power mode with a lower resolution when compared to the multiple exposure mode or approach. Furthermore, in the combined pixel mode, the system 600 may be capable to roughly calculate 3D data directly on the sensor chip without the need for data processing external to the sensor chip, since as discussed above, a rough distance calculation can be performed using only a simple arctan calculation. Such a calculation may be implemented fully in hardware directly on the sensor chip using gates and/or other logic available in hardware. Thus, the combined pixel mode may allow determining 3D data fully on the sensor chip without external calculator devices.

The system 600 in some embodiments can switch from the lower power mode described herein to a higher resolution mode based on a number of factors or conditions. The low-power mode is also referred to as a low-resolution mode. For example, a touchless gesture control system can use the lower power mode initially and switch to the higher resolution mode once activity is detected to enable more precise measurements. Another example is face detection, where the lower power mode is used for shape detection. Once a shape is detected, the system switches to higher resolution mode to measure facial features. Other variations and uses are also contemplated for the system 600.

In view of the detailed discussion above, it will be appreciated that the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for processing pixel signal values from an image sensor having a plurality of pixels, each pixel being configured to generate a respective pixel signal value by demodulating received light using a reference signal, the method comprising:
controlling at least a first subset of the plurality of pixels to generate respective pixel signal values, based on a first reference signal applied to the first subset of pixels, for a first exposure;
subsequent to the first exposure, controlling the first subset of the plurality of pixels to hold their respective pixel signal values;
while the first subset of the plurality of pixels are holding their respective pixel signal values, controlling a second subset of the plurality of pixels to generate respective pixel signal values, based on a second reference signal applied to the second subset of pixels, for a second exposure, wherein the first and second subsets are mutually exclusive;
subsequent to the second exposure, controlling the second subset of the plurality of pixels to hold their respective pixel signal values; and
reading out a pixel signal value from each pixel of the first and second subsets of the plurality of pixels and converting each read pixel signal value to a respective digital pixel value;
wherein the first reference signal has a first phase, relative to a modulating signal applied during the first exposure to an optical signal being measured by the image sensor, and the second reference signal has a second phase, relative to the modulating signal applied during the second exposure to the optical signal being measured by the image sensor.

2. The method of claim 1, wherein the plurality of pixels are arranged in an array having lines and columns, and wherein the first subset of pixels comprises pixels in every odd or even line of the array and the second subset of pixels comprises the remaining pixels.

3. The method of claim 1, wherein the method further comprises generating depth values for a depth map by combining, for each depth value, a digital pixel value for a pixel of the first subset with a digital pixel value for a corresponding pixel of the second subset.

4. The method of claim 3, wherein the plurality of pixels are arranged in an array having lines and columns, the first subset of pixels comprising pixels in every odd or even line of the array and the second subset of pixels comprising the remaining pixels, and wherein said combining comprises, for each depth value, combining a digital pixel value for a pixel in any given line with the digital pixel value for the neighboring pixel in an immediately adjacent line.

5. The method of claim 1, wherein the method further comprises generating depth values for a depth map by combining, for each depth value, a digital pixel value for a pixel of the first subset with a digital pixel value for a corresponding pixel of the second subset, wherein the difference between the first phase and the second phase is 90 degrees, and wherein said combining comprises computing an arctangent of a ratio of the digital pixel values for the pixels.

6. An image processing system comprising:
a sensor comprising a plurality of pixels configured to generate a respective plurality of pixel signal values in response to received light, wherein each pixel is configured to obtain its respective pixel signal value by demodulating received light using a reference signal;
a reference signal generator configured to generate the reference signal and to provide the reference signal to the plurality of pixels, and an analog-to-digital converter (ADC) circuit operatively coupled to the plurality of pixels, and
control circuitry configured to:
control the reference signal generator to generate a first reference signal;
control at least a first subset of the plurality of pixels to generate respective pixel signal values, based on the first reference signal, for a first exposure;
subsequent to the first exposure, control the first subset of the plurality of pixels to hold their respective pixel signal values;
control the reference signal generator to generate a second reference signal, while the first subset of the plurality of pixels are holding their respective pixel signal values;
while the first subset of the plurality of pixels are holding their respective pixel signal values, control a second subset of the plurality of pixels to generate respective pixel signal values, based on the second reference signal, for a second exposure, wherein the first and second subsets are mutually exclusive;
subsequent to the second exposure, control the second subset of the plurality of pixels to hold their respective pixel signal values; and,
read out a pixel signal value from each pixel of the first and second subsets of pixels, for conversion to respective digital pixel values by the ADC circuit;
wherein the control circuitry is configured to generate the first reference signal so that it has a first phase, relative to a modulating signal applied during the first exposure to an optical signal being measured by the image sensor, and to generate the second reference signal so that it has a second phase, relative to the modulating signal applied during the second exposure to the optical signal being measured by the image sensor.

7. The image processing system of claim 6, wherein the plurality of pixels are arranged in an array having lines and columns, and wherein the first subset of pixels comprises pixels in every odd or even line of the array and the second subset of pixels comprises the remaining pixels.

8. The image processing system of claim 6, wherein the image processing system further comprises calculating logic configured to generate depth values for a depth map by combining, for each depth value, a digital pixel value for a pixel of the first subset with a digital pixel value for a corresponding pixel of the second subset.

9. The image processing system of claim 8, wherein the plurality of pixels are arranged in an array having lines and columns, the first subset of pixels comprising pixels in every odd or even line of the array and the second subset of pixels comprising the remaining pixels, and wherein the calculating logic is configured to, for each depth value, combine a digital pixel value for a pixel in any given line with the digital pixel value for the neighboring pixel in an immediately adjacent line.

10. The image processing system of claim 6, wherein the control circuitry is configured to generate the second reference signal to have the second phase, during the second exposure, by introducing a phase shift to an input reference signal, between the first and second exposures.

11. The image processing system of claim 6, wherein the image processing system further comprises calculating logic configured to generate depth values for a depth map by combining, for each depth value, a digital pixel value for a pixel of the first subset with a digital pixel value for a corresponding pixel of the second subset, wherein the difference between the first phase and the second phase is 90 degrees and wherein the calculating logic is configured to combine digital pixel values by computing an arctangent of a ratio of the digital pixel values for the pixels.

12. The image processing system of claim 11, further comprising a memory operatively coupled to the ADC circuit and configured to store digital pixel values for one line of the array at a time, wherein the calculating logic is configured to compute each arctangent using a digital pixel value stored in the memory and a corresponding digital pixel value for the neighboring pixel in the immediately adjacent line.

13. The method of claim 1, further comprising, for each pixel in the first subset of the plurality of pixels, combining the digital pixel value for the pixel in the first subset with a digital pixel value for a corresponding pixel of the second subset.

14. The image processing system of claim 6, further comprising calculating logic configured to, for each pixel in the first subset of the plurality of pixels, combine the digital pixel value for the pixel in the first subset with a digital pixel value for a corresponding pixel of the second subset.

* * * * *

UNITED STATES PATENT AND TRADEMARK OFFICE
CERTIFICATE OF CORRECTION

PATENT NO. : 11,506,763 B2
APPLICATION NO. : 16/176817
DATED : November 22, 2022
INVENTOR(S) : M. Dielacher et al.

It is certified that error appears in the above-identified patent and that said Letters Patent is hereby corrected as shown below:

In the Claims

Column 15, Line 4 (Claim 11) please change "degrees and" to -- degrees, and --

Signed and Sealed this
Seventh Day of February, 2023

Katherine Kelly Vidal
*Director of the United States Patent and Trademark Office*